Figure 1:
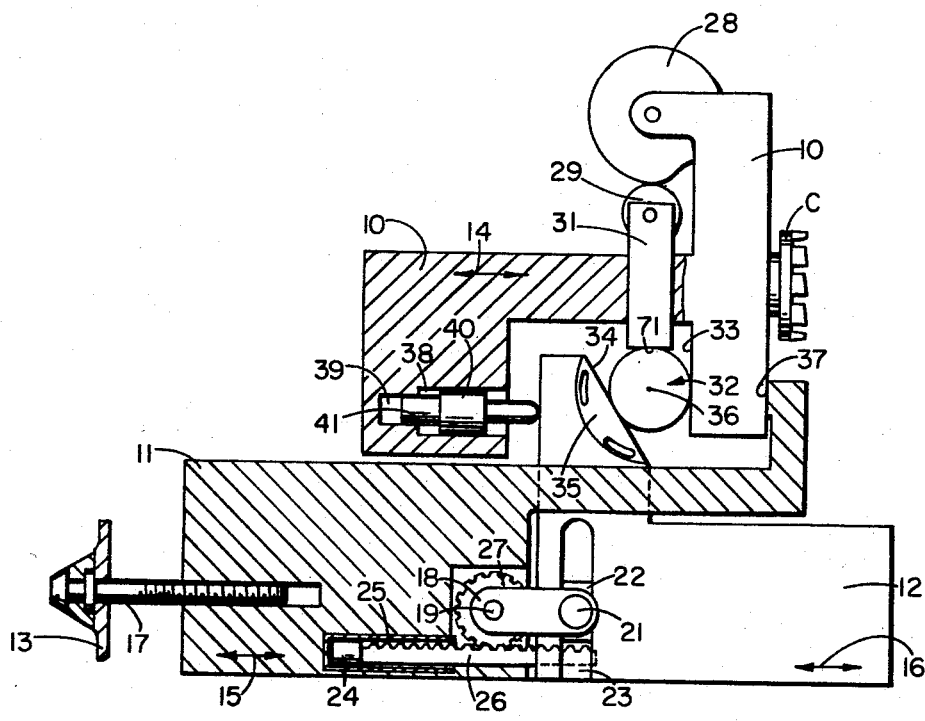

May 30, 1967   J. L. ASH II   3,321,981
ADJUSTABLE-STROKE SLIDE OPERATING MECHANISM
Filed Aug. 5, 1965

INVENTOR.
JOHN L. ASH II
BY Richard W. Treverton
ATTORNEY

May 30, 1967   J. L. ASH II   3,321,981
ADJUSTABLE-STROKE SLIDE OPERATING MECHANISM
Filed Aug. 5, 1965   3 Sheets-Sheet 3
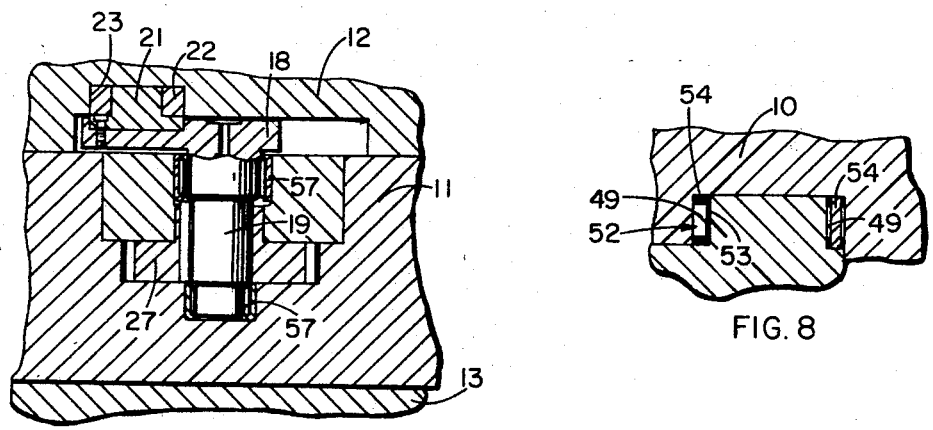
FIG. 5
FIG. 8
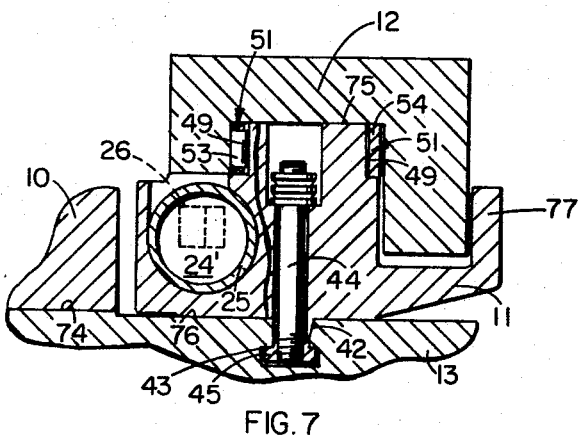
FIG. 7
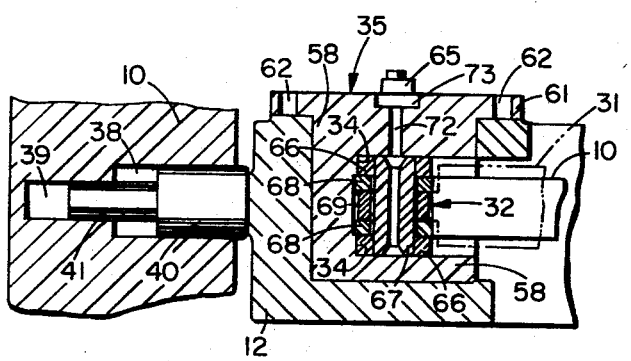
FIG. 6

United States Patent Office 3,321,981
Patented May 30, 1967

---

3,321,981
ADJUSTABLE-STROKE SLIDE OPERATING MECHANISM
John L. Ash II, Pittsford, N.Y., assignor to The Gleason Works, Rochester, N.Y., a corporation of New York
Filed Aug. 5, 1965, Ser. No. 477,547
7 Claims. (Cl. 74—55)

The present invention relates to a mechanism for operating a machine tool slide, and particularly such a mechanism which is adjustable to vary the stroke of the slide.

A primary objective is a compact and rigid mechanism, capable of stepless stroke adjustment. Further objectives are a mechanism adapted to operate the slide through a relatively small stroke of adjustable length by means of one actuator, preferably a cam, and through a greater stroke by a second actuator.

The preferred embodiment of the invention illustrated in the accompanying drawings is designed for actuating the cutter-carrying slide of a bevel gear generator of the type disclosed in application Serial No. 477,510 filed on even date herewith now Patent No. 3,288,031 by Adolph H. Krastel and Harry Pedersen, the mechanism for this purpose being actuated by a cam to reciprocate the slide to feed the cutter into the work gear and then withdraw it clear of the gear to enable tooth-to-tooth indexing of the latter. The mechanism is further actuated by a hydraulic actuator to withdraw the slide through a greater stroke for providing clearance between the cutter and work holder required for changing workpieces and to then return the slide to cutting position.

Figure 2:
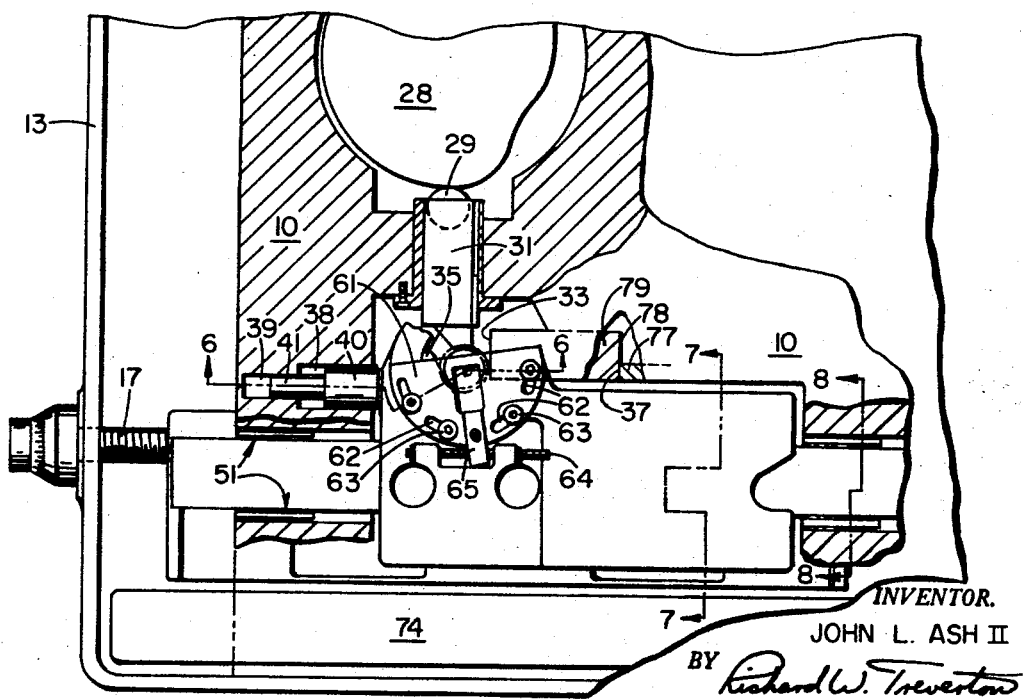
Figure 3:
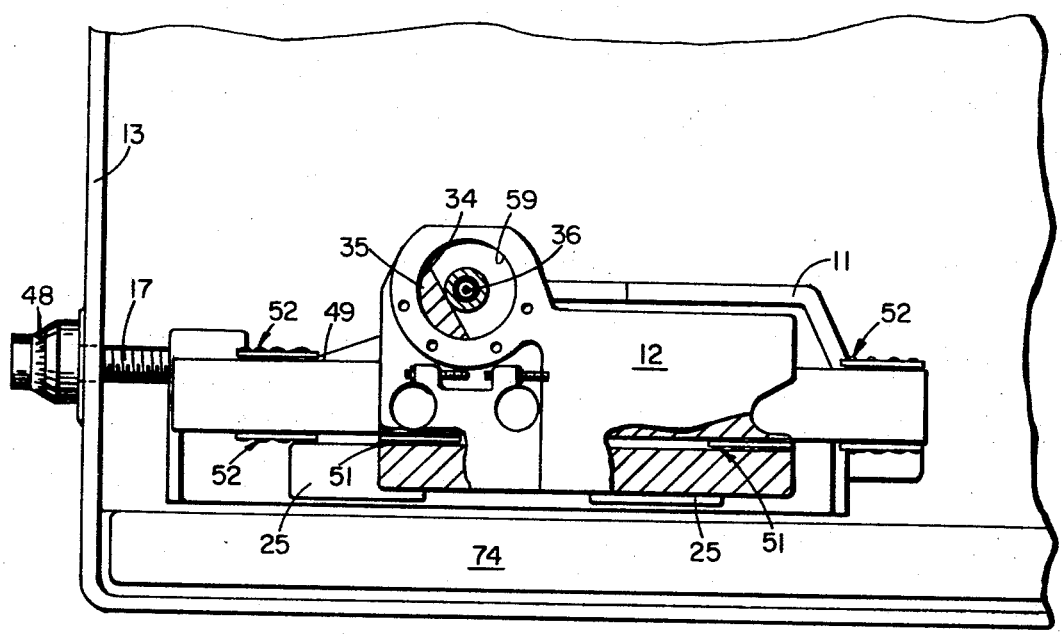
Figure 4:
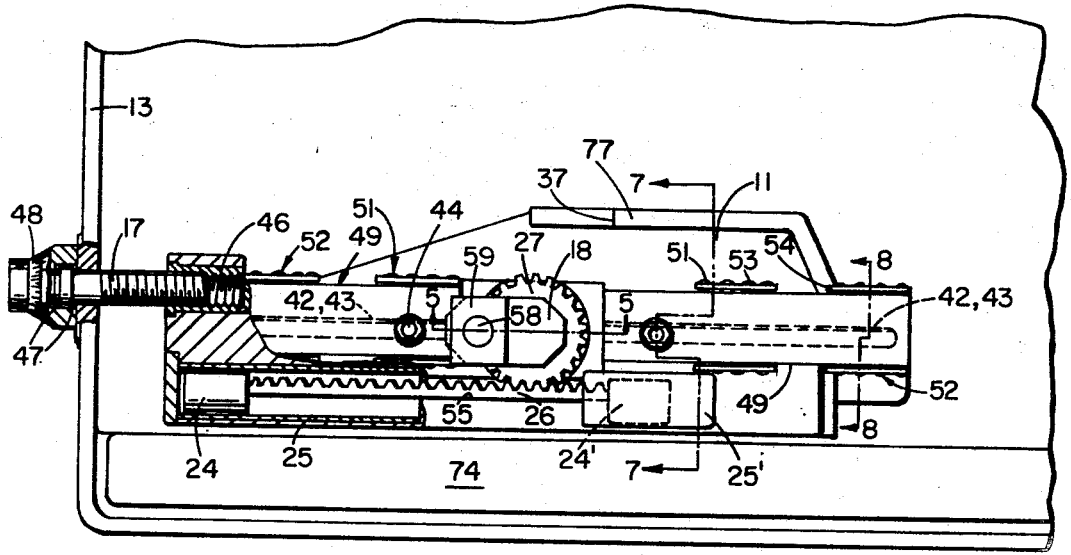

In the drawings:

FIG. 1 is a schematic plan view of the mechanism;

FIGS. 2, 3 and 4 are plan views of the mechanism, partly in section, and with certain of the parts shown in FIG. 2 removed in FIG. 3, and further parts removed in FIG. 4, to show the structure therebeneath; and, FIGS. 5 to 8 are vertical sections respectively in the plane 5—5 of FIG. 4, planes 6—6 of FIG. 2, and planes 7—7 and 8—8 of FIGS. 2 and 4.

Referring to FIG. 1, a slide 10, guide 11 and feed adjustment bracket 12 are supported for independent rectilinear motion in parallel paths relative to the machine frame 13, as indicated by arrows 14, 15 and 16. The slide 10, which carries a face mill cutter, designated C, moves to the right to advance the cutter toward or into the work, also not shown, and to the left to withdraw the cutter. During set up of the machine the slide, guide and bracket may be adjusted as a unit relative to frame, either to the right or the left, by turning a screw 17 that is rotatably supported by the frame 13 and is screw-threaded to guide 11. After such adjustment the guide is clamped to the frame by means described hereinafter.

The adjustment bracket 12 (and with it the slide 10) is movable relative to frame 13 and guide 11 by means of a crank 18 whose shaft 19 is rotatable in the guide 11 and whose crank pin 21 supports a bearing block 22 that is slidable in a cross-slot 23 in the bracket. The crank is rotatable back and forth through one half turn by means including hydraulic piston 24 in cylinder 25 on guide 11, rack 26, and pinion 27 on the crank shaft. Upon motion of the piston and rack to the right, the crank is rotated counterclockwise, from the position shown, to withdraw bracket 12 and slide 10 to the left, to a position wherein the cutter is well clear of the work, to enable changing the latter; and on motion of the piston and rack to the left, the crank is turned clockwise to the position shown, thereby advancing the bracket 12 and slide 10 to cutting or near-cutting position.

When in the latter position the slide 10 is reciprocated right and left relative to the guide, bracket and frame 11–13, by rotation of cam 28. This cam is supported by the slide and is rotated unidirectionally by a slide-carried motor, not shown. It acts against a cam follower roller 29 carried by a plunger 31 that is guided for reciprocation in slide 10 in a direction transverse of the slide direction 14. Plunger 31 bears against a roller 32 which is confined between the plunger and a surface 33 of slide 10 and surface 34 of a feed adjustment shoe 35. This shoe is angularly adjustable on the bracket 12 to vary the inclination of its surface 34 relative to the direction of slide motion 14. The axis of adjustment of the shoe coincides with the axis 36 of roller 32 when the roller 29 is on the crest of cam 28, at which time the slide 10 is in its limit position of infeed, to the right, relative to bracket 12.

The parts are so proportioned that in this position the slide 10 abuts surface 37 of guide 11, so that the slide 10 is in effect clamped between the roller 32 and the guide 11, and the roller is squeezed between the plunger 31, shoe 35 and slide 10. Hence the slide 10 is rigidly clamped, mechanically, to the guide 11, while the latter is clamped to the frame 13 by means later to be described. In all other positions of the feed cam 28, the slide 10 is away from surface 37 of guide 11 and is held against roller 32 by fluid pressure in a cylinder chamber 38, or in cylinder chambers 38 and 39, which are provided in slide 10. Integral pistons 40 and 41 in these cylinder chambers bear against bracket 12. Hydraulic pressure is applied to both chambers 38 and 39 throughout the periods when the cam 28 is acting to allow the slide 10 to withdraw (to the left) relative to bracket 12, for the slide withdrawal is, in fact, effected by this hydraulic pressure, the rate of withdrawal however being controlled by the cam. When the cam is acting to advance the slide 10 relative to bracket 12, little pressure is required, so that hydraulic pressure is applied only to chamber 39, not to chamber 38. The alternate application of hydraulic pressure to chamber 38 is controlled by valve means, not shown, coordinated with cam 28.

The guide 11 has a tongue 42, FIGS. 4 and 7, guided in a T-slot 43 in the frame, and, after adjustment by screw 17, may be secured to the frame by tightening screws 44 secured to a retainer 45 in the slot. The screw 17, threaded to a nut 46 anchored in the guide 11, is supported in the frame on antifriction thrust bearings 47 and is rotatable by means of a graduated dial 48. Plane vertical surfaces 49 of guide 11 serve as races for linear roller bearings 51 and 52 by which bracket 12 and the slide 10 are respectively guided for their motions in directions 16 and 14, FIG. 1. Each of these roller bearings comprises a plurality of rollers 53 mounted in a roller-spacing and retaining strip 54. The relation of the bearings 51 and 52 to the guide 11, bracket 12 and slide 10 is illustrated in FIGS. 2 to 4, 7 and 8.

Referring to FIGS. 4, 5 and 7, the guide 11 has secured therein two cylinder sleeves 25, 25' in which opposed pistons 24, 24' are reciprocable. The rack 26, extending between the pistons, is guided in a slot 55 in guide 11. Pinion 27, meshing with the rack, is keyed to shaft 19 of crank 18, the shaft being journaled in the guide 11 on needle bearings 57.

Referring to FIGS. 2, 3 and 6, the shoe 35, which is shown in horizontal section in FIG. 3, has upper and lower cylindrical portions 58 which are rotatable in cylindrical bore 59 in bracket 12. The shoe has, at its upper extremity, a substantially semicircular flange 61 overlying the bracket and having arcuate slots 62 for passing the shanks of screws 63 which secure the shoe to the bracket. Upon loosening of these screws the shoe may be adjusted angularly (and then clamped) by means of opposed set screws 64 which engage opposite sides of an arm 65 rigid with the shoe.

As shown in FIG. 6, the shoe has two axially spaced portions of surface 34 for engaging section 66 of roller 32 that are mounted on a roller pin 67. Two other sections of the roller, designated 68, are mounted on the pin on needle bearings, and bear on plane surface 33 of slide 10. Still another section, 69, of the roller 32 bears against the plane end face 71 of cam follower plunger 31, and is mounted on pin 67 on another set of needle bearings. The five roller sections are coaxial. Roller sections 66 are of a diameter slightly smaller than sections 68 and larger than section 69. Since the several sections are relatively rotatable their motions upon the respective plane surfaces 34, 33 and 71 may be substantially pure rolling motions. Due to this antifriction roller arrangement and the provision of antifriction bearings 51 and 52, the feed motion effected or controlled by cam 28 is relatively easy throughout a wide range of angular adjustments of the shoe 35, making possible a wide range of stroke lengths of slide 10. Roller 32 is lubricated through passages 72 extending from a well 73 in shoe 35 through the upper portion of the shoe 35 and pin 67.

The slide 10, although guided by bearings 52 on guide member 11, is supported for its sliding motion on a pair of parallel horizontal pads 74 on the frame 13, one of these pads appearing in FIGS. 2 to 4 and 7. The guide 11 is supported for its sliding motion on horizontal surface 76 of frame 13, FIG. 7, while the adjustment bracket 12 is slidable on horizontal surface 75 of the guide member. Referring to FIGS. 1, 2 and 4, the abutment surface 37 of guide 11 is provided on an upstanding flange 77 of the guide (see also FIG. 7), and abuts surface 78 of a depending flange 79 of slide 10.

Having now described the principle and a preferred embodiment of my invention, what I claim is:

1. A mechanism for effecting feed motions between two relatively slidable members of a machine tool, comprising a roller, first and second roller engaging surfaces respectively on the first and the second of said members, said surfaces being inclined to each other and to the path of relative motion of said members, an actuator for moving the roller along said surfaces to effect such relative motion in one direction, the actuator including a cam rotatable on said first member and a plunger reciprocable on said first member transversely of said path, said plunger having a follower for said cam and a surface engaging said roller, the latter being confined between the three surfaces, means for urging such relative motion in the opposite direction to the extent permitted by said cam, and means for adjusting said second surface on said second member to vary its inclination to said path.

2. A mechanism according to claim 1 in which said roller has separate, coaxial, relatively rotatable sections which respectively engage the three surfaces.

3. A mechanism according to claim 1 for a machine having a frame slidably supporting said first member, a guide adjustable on the frame in a direction parallel to said path of relative sliding, means for moving said second member parallel to said path back and forth on said guide through a predetermined stroke, and an abutment surface on said guide against which said first member is clamped by said actuator at the end of said relative motion in said one direction.

4. A mechanism according to claim 3 in which the means for moving said second member comprises a crank rotatable back and forth through 180° on the guide to thereby advance and retract said second member by a stroke equal to the diameter of the crank circle.

5. A mechanism according to claim 3 in which the adjustment axis of said second surface coincides with the axis of the roller when the first member is against said abutment surface.

6. A mechanism for a machine having frame supporting first and second members for parallel sliding motion relative to the frame and to each other, comprising a roller, first and second roller engaging surfaces respectively on the first and the second of said members, said surfaces being inclined to each other and to the path of relative motion of said members, an actuator mounted on said first member for moving the roller along said surfaces to effect such relative motion in one direction, the roller being confined between a surface of the actuator and said surfaces, means for urging such relative motion in the opposite direction to the extent permitted by said actuator, means for adjusting said second surface on said second member to vary its inclination to said path, means for moving the second member relative to the frame along said path, an abutment surface for limiting the motion of the first member relative to the frame, and said second surface being on a shoe which to effect said variation of inclination is adjustable upon said second member about an axis which coincides with the axis of the roller when said first member is against said abutment surface.

7. A mechanism for effecting feed motions between two relatively slidable members of a machine tool, comprising a roller, first and second roller engaging surfaces respectively on the first and the second of said members, said surfaces being inclined to each other and to the path of relative motion of said members, an actuator mounted on said first member for moving the roller along said surfaces to effect such relative motion in one direction, the roller being confined between a surface of the actuator and said surfaces, means for urging such relative motion in the opposite direction to the extent permitted by said actuator, and said second surface being on a shoe which, for varying the inclination of said second surface to said path, is adjustable upon said second member about an axis which coincides with the axis of the roller in one position of the actuator relative to the member.

References Cited

UNITED STATES PATENTS 2,786,462  3/1957  Johnson _____ 74—110 X

MILTON KAUFMAN, *Primary Examiner.*

FRED C. MATTERN, *Examiner.*

D. H. THIEL, *Asisstant Examiner.*